(12) United States Patent
Chattopadhyay et al.

(10) Patent No.: US 10,510,154 B2
(45) Date of Patent: Dec. 17, 2019

(54) ADAPTIVE PROCESSING OF SPATIAL IMAGING DATA

(71) Applicant: Intel Corporation, Santa Clara, CA (US)

(72) Inventors: Rita Chattopadhyay, Chandler, AZ (US); Monica Lucia Martinez-Canales, Los Altos, CA (US); Vinod Sharma, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 15/850,246

(22) Filed: Dec. 21, 2017

(65) Prior Publication Data

US 2019/0051006 A1    Feb. 14, 2019

(51) Int. Cl.

| G06T 7/521 | (2017.01) |
|---|---|
| G06T 7/10 | (2017.01) |
| G06T 7/70 | (2017.01) |
| G01S 7/48 | (2006.01) |
| G06T 7/11 | (2017.01) |

(Continued)

(52) U.S. Cl.
CPC ............ G06T 7/521 (2017.01); G01S 7/4802 (2013.01); G06K 9/00 (2013.01); G06T 7/10 (2017.01); G06T 7/11 (2017.01); G06T 7/143 (2017.01); G06T 7/70 (2017.01); *G01S 7/4808* (2013.01); *G01S 17/936* (2013.01);

(Continued)

(58) Field of Classification Search
CPC ..... G01S 7/4808; G01S 7/4802; G06T 7/521; G06T 7/10; G06T 7/70; G06T 2207/30252; G06T 7/143; G06T 7/11
See application file for complete search history.

(56) References Cited

U.S. PATENT DOCUMENTS

| 9,412,271 | B2 * | 8/2016 | Sharma ................. G08G 1/052 |
| 2010/0111396 | A1 * | 5/2010 | Boucheron .......... G06K 9/0014 |
| | | | 382/133 |

(Continued)

OTHER PUBLICATIONS

Wang, Chunxiao et al. "An Improved DBSCAN Method for LiDAR Data Segmentation with Automatic Eps Estimation." Sensors Basel, Switzerland)vol. 19,1 172. Jan. 5, 2019, doi:10.3390/s19010172 (Year: 2019).*

(Continued)

*Primary Examiner* — Utpal D Shah
(74) *Attorney, Agent, or Firm* — Schwegman Lundberg & Woessner, P.A.

(57) ABSTRACT

Machine vision processing includes capturing 3D spatial data representing a field of view and including ranging measurements to various points within the field of view, applying a segmentation algorithm to the 3D spatial data to produce a segmentation assessment indicating a presence of individual objects within the field of view, wherein the segmentation algorithm is based on at least one adjustable parameter, and adjusting a value of the at least one adjustable parameter based on the ranging measurements. The segmentation assessment is based on application of the segmentation algorithm to the 3D spatial data, with different values of the at least one adjustable parameter value corresponding to different values of the ranging measurements of the various points within the field of view.

25 Claims, 10 Drawing Sheets

(51) Int. Cl.
 *G06K 9/00* (2006.01)
 *G06T 7/143* (2017.01)
 *G01S 17/93* (2006.01)
(52) U.S. Cl.
 CPC .............................. *G06T 2200/04* (2013.01); *G06T 2207/10028* (2013.01); *G06T 2207/30252* (2013.01)

(56) References Cited

U.S. PATENT DOCUMENTS

| | | | |
|---|---|---|---|
| 2018/0067490 A1* | 3/2018 | Pollach | B60W 10/184 |
| 2018/0144202 A1* | 5/2018 | Moosaei | G06K 9/6274 |
| 2018/0189950 A1* | 7/2018 | Norouzi | G06T 7/11 |
| 2018/0365506 A1* | 12/2018 | Clifford | G06K 9/00201 |
| 2019/0187720 A1* | 6/2019 | Fowe | G06N 20/00 |

OTHER PUBLICATIONS

Ester, Martin, et al. "A density-based algorithm for discovering clusters in large spatial databases with noise." Kdd. vol. 96. No. 34. 1996. (Year: 1996).*

* cited by examiner

ADAPTIVE PROCESSING OF SPATIAL IMAGING DATA

TECHNICAL FIELD

Embodiments described herein generally relate to sensing, measurement, and data processing and, more particularly, to data processing of three-dimensional spatial measurements that may be used in machine-vision and object detection.

BACKGROUND

A variety of three-dimensional (3D) spatial measurement technologies are available and in development for facilitating machine vision. Among a multitude of applications, autonomous vehicles represent a rapidly-growing segment in need of effective and robust machine vision technology.

In the context of autonomous vehicle control, it is desirable to have a system recognize a variety of different objects that may be encountered, such as other vehicles, pedestrians, bicycles, trees, buildings, bridges and other infrastructure, as well as obstacles such as bumps and potholes, construction barriers, debris, animals, and the like. When an autonomous system recognizes different types of objects, their various behaviors may be predicted to enhance the safety and comfort of the autonomous vehicle.

Before objects can be recognized by a machine-vision system, they must first be detected from among their surroundings. This detection process is referred to as segmentation. There is an ongoing need to improve the performance and computational efficiency of the segmentation operations to provide more effective, reliable, and affordable machine vision solutions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1A:
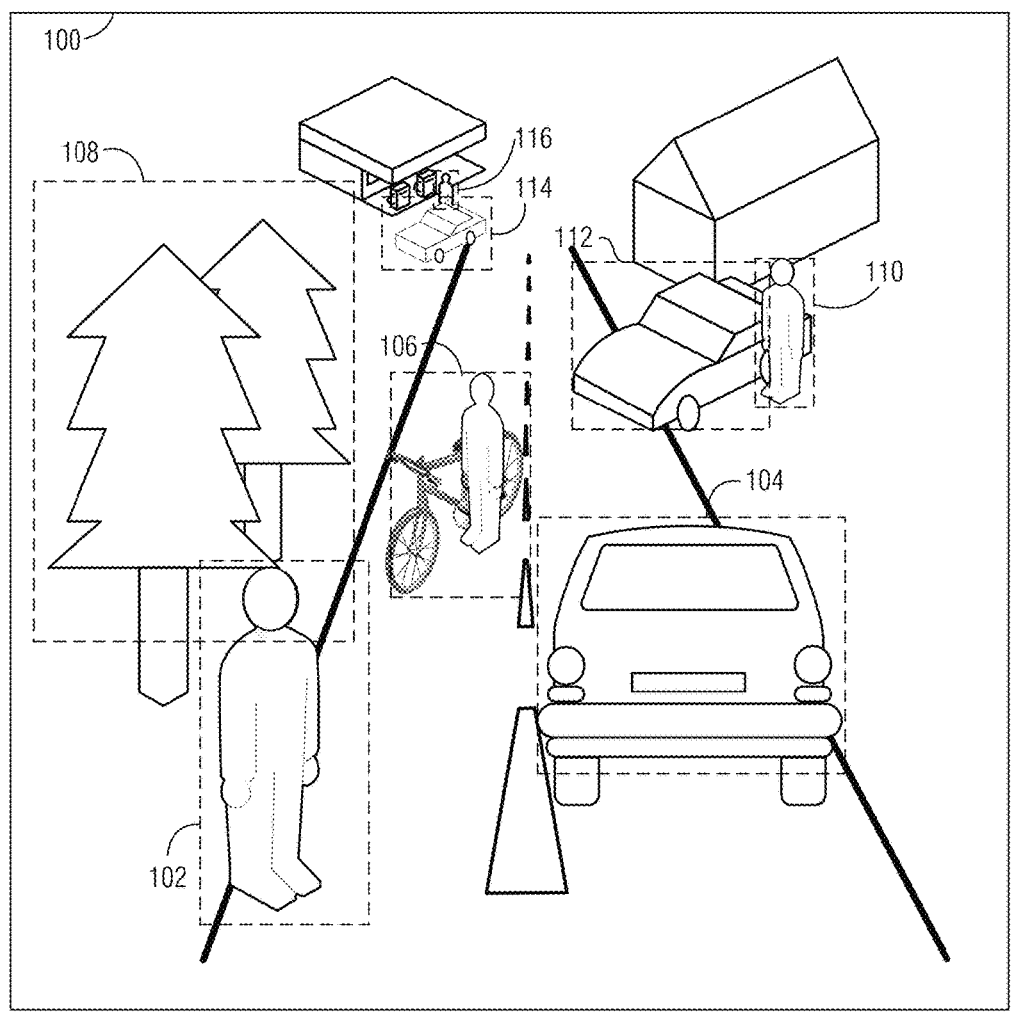
FIG. 1A is a diagram illustrating an example field of view of a 3D capture device in which various objects are present.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Aspects of the embodiments may be implemented as part of a data-processing and computing platform. The data-processing and computing platform may be one physical machine, or may be distributed among multiple physical machines, such as by role or function, or by process thread in the case of a cloud computing distributed model. In various embodiments, aspects of the invention may be configured to run in virtual machines that in turn are executed on one or more physical machines. It will be understood by persons of skill in the art that features of aspects of the present subject matter may be realized by a variety of different suitable machine implementations.

Aspects of the embodiments are directed to adaptation of 3D spatial measurement analysis parameters based on the content of the measurement signal itself. The adaptation of the parameters may facilitate detection or recognition of objects for varying conditions under which the measurement was made. For example, a variable condition may be the distance to the measured object. Another variable condition may be an environmental condition, such as the visibility, which in turn may depend on the weather or air quality conditions such as clear weather, rain, fog, dust, pollution, or other particulate matter, snow, etc. Another example of a variable environmental condition is the ambient lighting, shadows, solar position or lunar position relative to the observation field, or other illumination source(s).

In various embodiments, different 3D spatial measurement modalities are contemplated. Light detection and ranging (LiDAR) is an example of a 3D spatial measurement modality. It works by measuring distance to an object by illuminating that object with a pulsed laser light, and measuring reflected pulses with a sensor. Differences in laser return times and wavelengths is used to make a digital 3D-representation of the object, including the object's distance from the point of measurement, its outline, and surface contour. In turn, the features of the digital 3D representation may be used to recognize measured objects from among a library of known objects.

Other 3D spatial measurement technologies, whether presently known, or arising in the future, may be utilized. For instance, a 3D capture device configured to scan surfaces and measure distance may be a camera with 3D scanning capability utilizing laser ranging, stereoscopic vision, or other suitable technology. In a related example, a 3D capture device may include a hybridization or technologies, such as an image-capture device, such as a digital camera, that produces an output cooperatively with 3D distance measurements obtained ultrasonically, using radio detection and ranging (RADAR), or the like, wherein captured images may be overlaid, or otherwise mapped to, the 3D distance measurements.

Various examples described below contemplate the use of a LiDAR system as a practical 3D capture device. However, it should be understood that any suitable 3D capture modality, or combination of modalities, may be utilized. In general, the output from a 3D capture device, whether LiDAR or another type, includes ranging, or distance, indicia. For instance, the output may include a point cloud of measured distances within the field of view of the 3D capture device.

Segmentation is performed on the point cloud as part of the signal processing to detect the presence of objects. According to some examples, as will be described in greater detail below, segmentation operations identify clusters in point cloud data corresponding to different objects in the field of view of the 3D capture device. The clusters of points represent detectable objects.

FIG. 1A is a diagram illustrating an example field of view of a 3D capture device in which various objects are present. As illustrated, field of view 100 is a perspective view as may be seen by an autonomous vehicle. Nearby objects include pedestrian 102, and vehicle 104. Objects at an intermediate distance include trees 108, bicycle and human 106, human 110, and vehicle 112. Distant objects include vehicle 114 and human 116. When scanned by a 3D capture device, field of view 100 may be represented as a point cloud having points positioned at the respective surfaces of the various objects. The location of each point may be represented in a Cartesian, cylindrical, spherical, or other suitable three-dimensional coordinate system.

One challenge in segmenting or clustering point cloud data is the uneven distribution of the 3D data in field of view 100. This may be due to differences in LiDAR return signals from objects at various distances from the measuring point. For example, due to various measurement-configuration, environmental, and other conditions, LiDAR return signals from distant objects may be too weak to be detected, or may correspond to a small number of points in the point cloud.

Figure 1B:
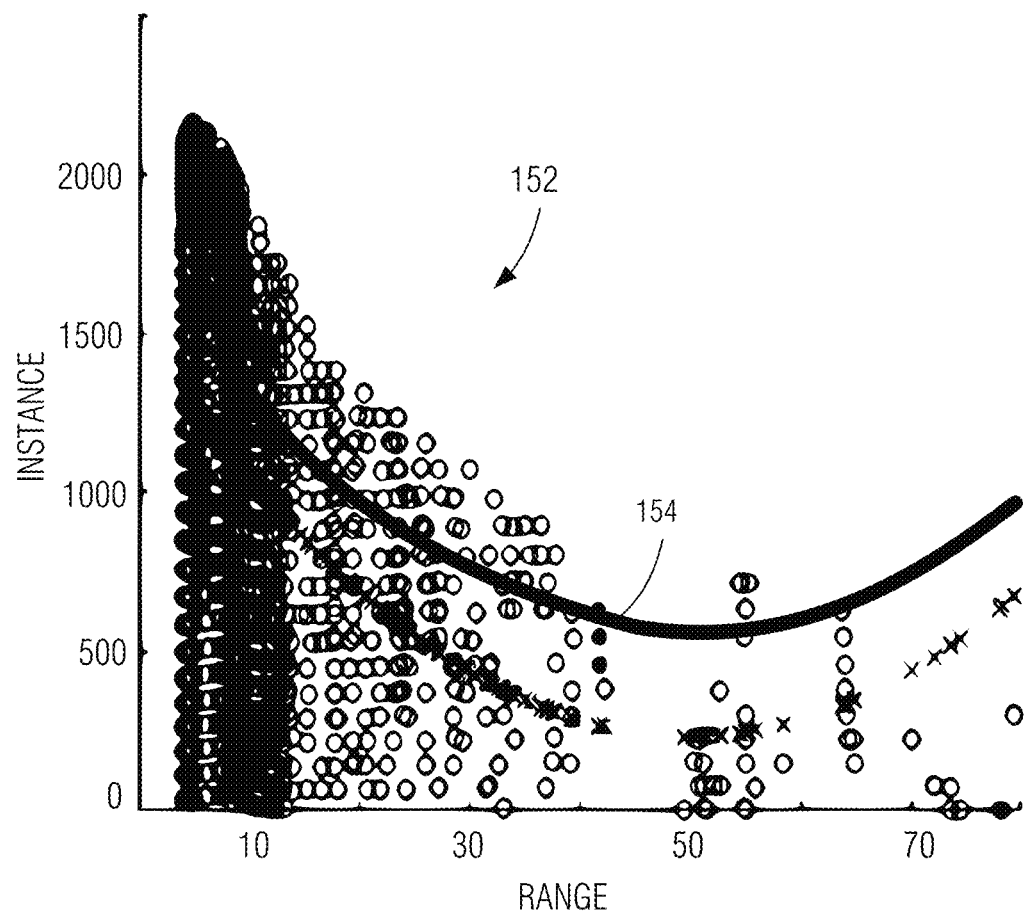
FIG. 1B is a graph illustrating an example distribution of LiDAR returns from a given empirical scenario.

FIG. 1B is a graph illustrating a distribution 152 of LiDAR returns from a given empirical scenario. The range values along the horizontal axis represent distance (e.g., meters) from the measuring instrument to corresponding points of the point cloud, whereas the vertical axis represents spatial distribution of LiDAR returns at each distance, over combined height and width dimensions. Distribution 152 shows a higher density of LiDAR returns at close range, and a generally lower density of returns at greater ranges. Curve 154 represents the density function. The shape of curve 154 may be specific to the relative positioning of objects within the empirical scenario, type of range-measuring instrument, as well as dependent on various environmental conditions.

According to some aspects of the embodiments, parameters of the segmentation algorithm are dynamically adjusted in response to the point-cloud density function. Some embodiments adjust the segmentation algorithm parameters per candidate segment based primarily on the measured range to each candidate segment. Accordingly, for a given field of view, such as field of view 100, the various objects therein may be processed with differing segmentation algorithm parameter values.

In a related type of embodiment, candidate segments at the same or similar range are processed with the same segmentation parameter values. Similarity of range may be defined based on certain similarity criteria, such as falling within a common band of ranges, for instance.

In related aspects of the embodiments, the parameters of the segmentation algorithm are further adjusted in response to a prevailing environmental condition that variously affects the point cloud distribution at different distances.

Various algorithms are contemplated for use in performing the segmentation operations. In various embodiments, one or more clustering algorithms are used. In related embodiments, one or more classification algorithms are used. In related embodiments, one or more machine learning algorithms are used. One or more of these types of algorithms may themselves be combined with one or more algorithms of other types. Each algorithm has its specific parameters that are subject to adjustment according to aspects of the embodiments. Various examples are provided in greater detail below, but it should be recognized that principles of the present subject matter are just as applicable to other segmentation algorithms and their corresponding variable parameters, whether known or arising in the future, that are not specifically mentioned in the present description.

A signal-processing and computing platform according to various embodiments may comprise a computing architecture suitable for carrying out its operations. In various applications, size, weight, and cost constraints are balanced against the computational performance called for to carry out those operations. As detailed more fully below, a number of practical realizations are contemplated, and the scope of the claimed subject matter should not be limited to any particular example described herein, unless expressly called out in in a corresponding claim. Portions of the signal-processing and computing platform may be implemented with specially-fabricated electronics in one or more very large-scale integrated (VLSI) circuits, with one or more field-programmable gate arrays (FPGAs), with a processor-based system that executes instructions, or with some combination of these types of devices.

Figure 2:
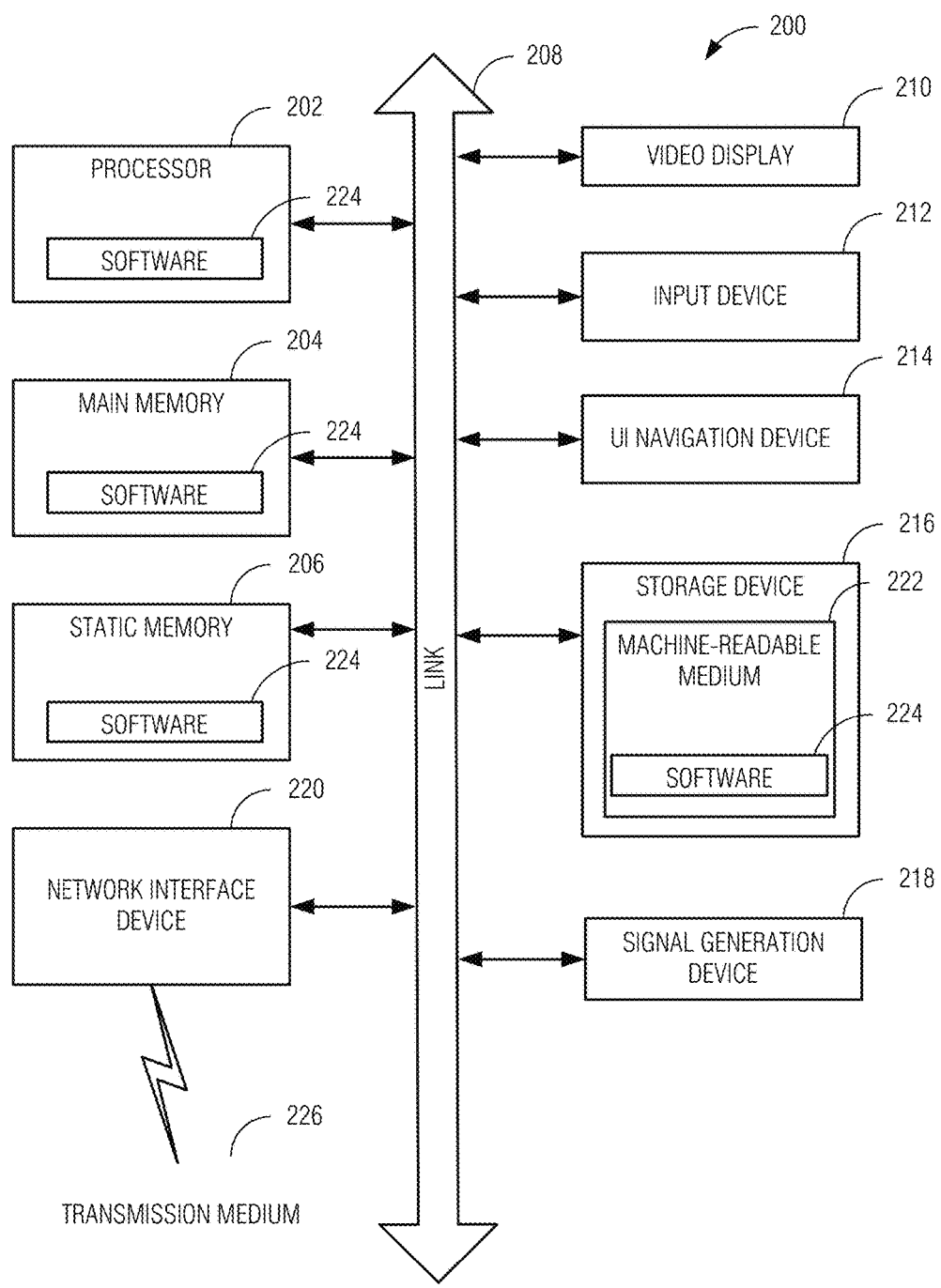
FIG. 2 is a block diagram illustrating a computer system in the form of a general-purpose machine, which may be incorporated as part of a portable, vehicle-mounted, stationary, or distributed-computing system.

As an example of a suitable computing platform, FIG. 2 is a block diagram illustrating a computer system 200 in the form of a general-purpose machine, which may be incorporated as part of a portable, vehicle-mounted, stationary, or distributed-computing system. In certain embodiments, programming of the computer system 200 according to one or more particular algorithms produces a special-purpose machine upon execution of that programming. In a networked deployment, the computer system may operate in the capacity of either a server or a client machine in server-client network environments, or it may act as a peer machine in peer-to-peer (or distributed) network environments. As will be discussed in some examples below, a device may operate in a client mode or a server mode in alternating fashion, depending on whether it is an initiator, or responder, to a transaction or message.

Example computer system 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computer system 200 may further include a video display unit 210, an input device 212 (e.g., an imaging sensor interface), and a user interface (UI) navigation device 214 (e.g., a mouse). The video display unit, according to various embodiments, may include a complex, user-interactive display, or a simple numerical or alpha-numerical display. In one embodiment, the video display unit 210, input device 212 and UI navigation device 214 are incorporated into a touch screen display. The computer system 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computer system 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3A:
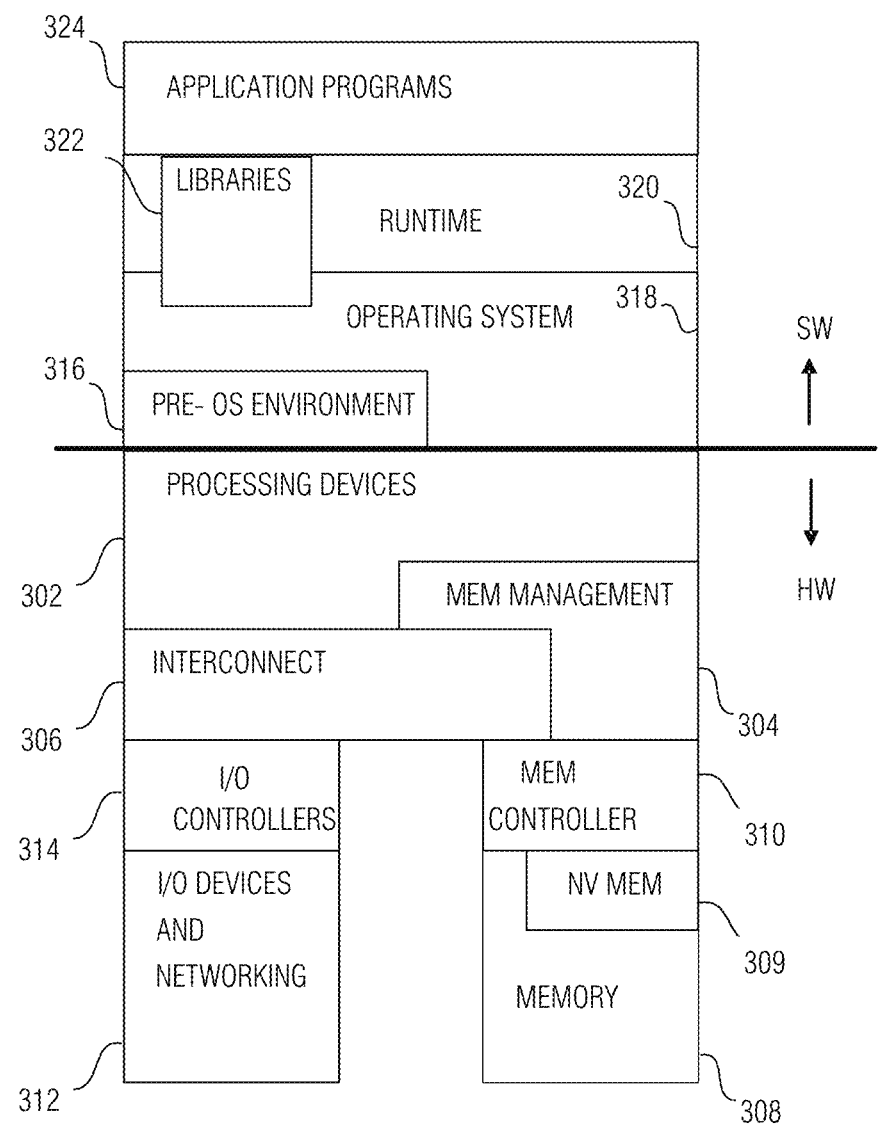
FIG. 3A is a diagram illustrating an exemplary hardware and software architecture of a computing device such as the one depicted in FIG. 2, in which various interfaces between hardware components and software components are shown according to some embodiments.

FIG. 3A is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 3B:
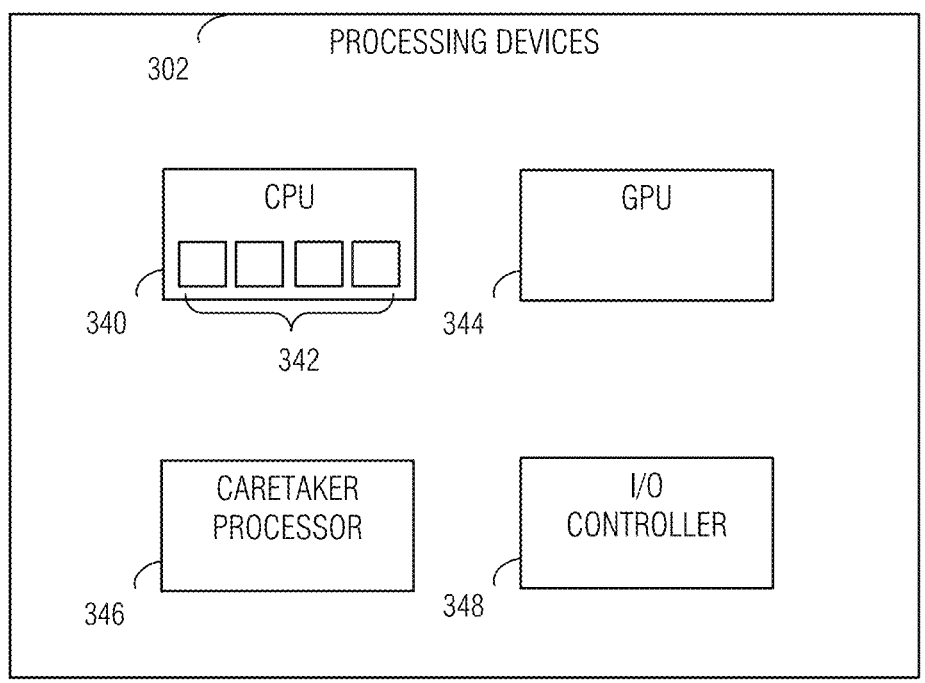
FIG. 3B is a block diagram illustrating examples of processing devices that may be implemented on a computing device according to some embodiments.

FIG. 3B is a block diagram illustrating processing devices 302 according to some embodiments. In one embodiment, two or more of processing devices 302 depicted are formed on a common semiconductor substrate. CPU 340 may contain one or more processing cores 342, each of which has one or more arithmetic logic units (ALU), instruction fetch unit, instruction decode unit, control unit, registers, data stack pointer, program counter, and other essential components according to the particular architecture of the processor. As an illustrative example, CPU 340 may be an x86-type of processor. Processing devices 302 may also include a graphics processing unit (GPU) 344. In these embodiments, GPU 344 may be a specialized co-processor that offloads certain computationally-intensive operations, particularly those associated with graphics rendering, from CPU 340. Notably, CPU 340 and GPU 344 generally work collaboratively, sharing access to memory resources, I/O channels, etc.

Processing devices 302 may also include caretaker processor 346 in some embodiments. Caretaker processor 346 generally does not participate in the processing work to carry out software code as CPU 340 and GPU 344 do. In some embodiments, caretaker processor 346 does not share memory space with CPU 340 and GPU 344, and is therefore not arranged to execute operating system or application programs. Instead, caretaker processor 346 may execute dedicated firmware that supports the technical workings of CPU 340, GPU 344, and other components of the computer system. In some embodiments, caretaker processor is implemented as a microcontroller device, which may be physically present on the same integrated circuit die as CPU 340, or may be present on a distinct integrated circuit die. Caretaker processor 346 may also include a dedicated set of I/O facilities to enable it to communicate with external entities. In one type of embodiment, caretaker processor 346 is implemented using a manageability engine (ME) or platform security processor (PSP). Input/output (I/O) controller 348 coordinates information flow between the various processing devices 340, 344, 346, as well as with external circuitry, such as a system interconnect.

Figure 3C:
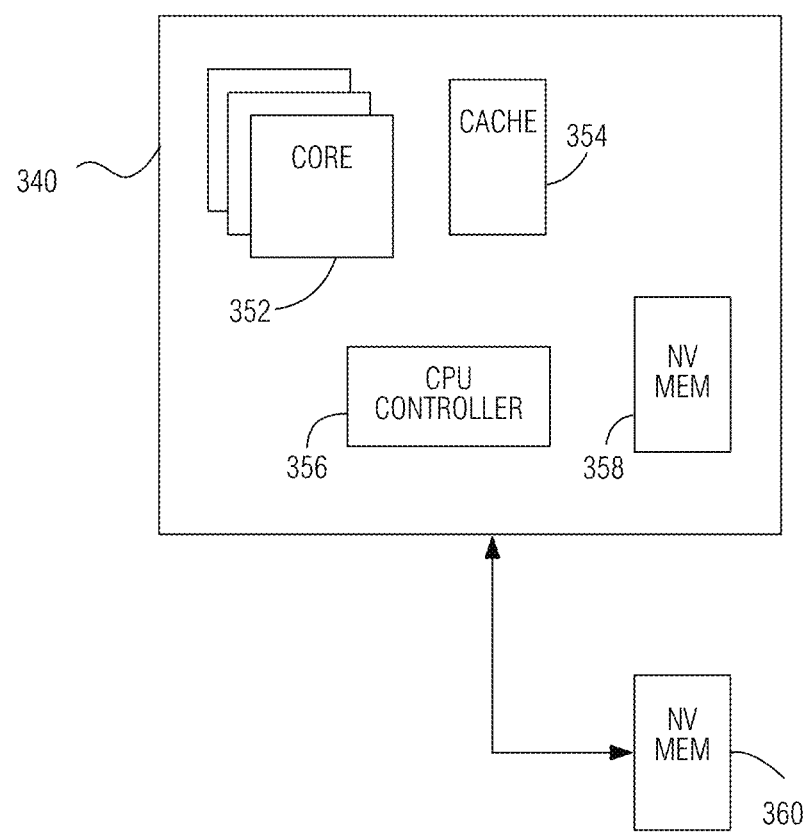
FIG. 3C is a block diagram illustrating example components of a processing device, according to various embodiments.

FIG. 3C is a block diagram illustrating example components of CPU 340 according to various embodiments. As depicted, CPU 340 includes one or more cores 352, cache 354, and CPU controller 356, which coordinates interoperation and tasking of the core(s) 352, as well as providing an interface to facilitate data flow between the various internal components of CPU 340, and with external components such as a memory bus or system interconnect. In one embodiment, all of the example components of CPU 340 are formed on a common semiconductor substrate.

CPU 340 includes non-volatile memory 358 (e.g., flash, EEPROM, etc.) for storing certain portions of foundational code, such as an initialization engine, and microcode. Also, CPU 340 may be interfaced with an external (e.g., formed on a separate IC) non-volatile memory device 360 that stores foundational code that is launched by the initialization engine, such as system BIOS or UEFI code.

Figure 4:
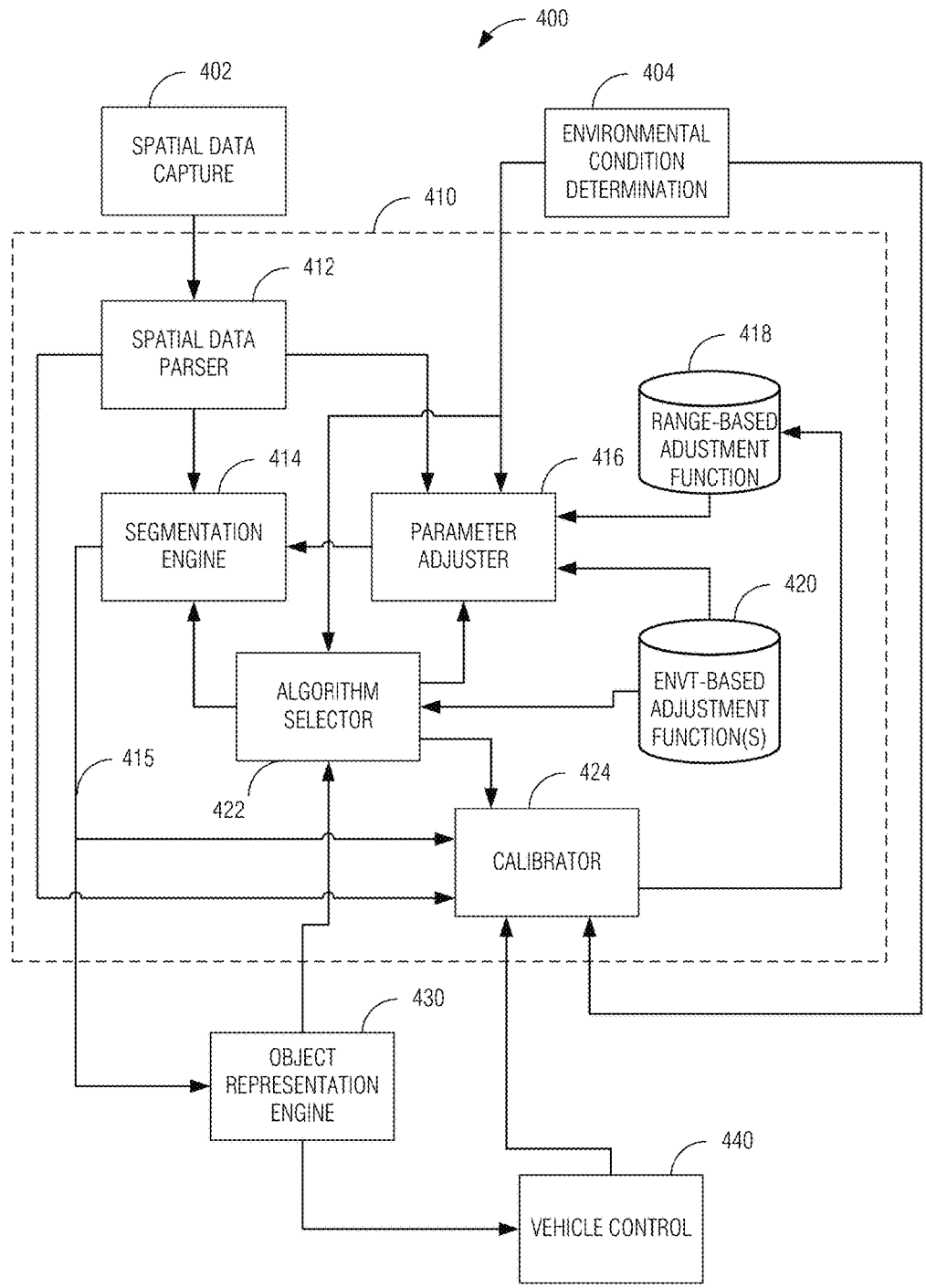
FIG. 4 is a system block diagram illustrating portions of a machine-vision system for use with an autonomous vehicle control system according to some example embodiments.

FIG. 4 is a system block diagram illustrating portions of a machine-vision system 400 for use with an autonomous vehicle control system according to some example embodiments. As illustrated, system 400 is composed of a number of subsystems, components, circuits, modules, or engines, which for the sake of brevity and consistency are termed engines, although it will be understood that these terms may be used interchangeably. Engines may be realized in hardware, or in hardware controlled by software or firmware. As such, engines are tangible entities specially-purposed for performing specified operations and may be configured or arranged in a certain manner.

In an example, circuits may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, an engine is physically constructed, or specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

System 400 includes spatial data capture subsystem 402. In some example embodiments, spatial data capture subsystem 402 may include an active sensor such as a LiDAR system, a video image capture system with laser ranging, SONAR, RADAR, or the like. More generally, spatial data capture subsystem 402 produces a point cloud (or equivalent) spatial representation of a field of view, which includes range information of surfaces throughout the field of view.

In related embodiments, system 400 may include environmental condition determination subsystem 404, which may be configured to gather and process data indicative of one or more variable environmental conditions, such as those affecting visibility (e.g., weather, illumination, etc.). Environmental condition determination subsystem 404 may include a measurement arrangement that senses indicia of the one or more environmental conditions, or it may receive data (e.g., weather reports) from an external source, such as a weather station or service.

System 400 further includes adaptive segmentation subsystem 410 according to an illustrative example. Adaptive segmentation subsystem 410 includes spatial data parser 412, segmentation engine 414, parameter adjuster 416, range-based adjustment function data store 418, environment-based adjustment function(s) data store 420, algorithm selector 422, and calibrator 424.

Spatial data parser 412 is an engine that includes data processing circuitry constructed, programmed, or otherwise configured, to process the incoming spatial data signal to read the position (including range) information associated with spatial measurements, and pass the location and range information it to segmentation engine 414 and parameter adjuster 416.

Segmentation engine 414 includes data processing circuitry constructed, programmed, or otherwise configured, to apply a segmentation algorithm, with variable parameters to the spatial data in order to identify the presence of objects in the field of view. Segmentation engine 414 may apply one or more segmentation algorithms, or combinations of algorithms, to produce a segmentation assessment 415 for each given subset of points of the spatial data. Segmentation assessment 415 may be considered an automated object-detection decision in which the measured spatial data is processed with respect to object-detection criteria and, if the criteria is met, the decision identifies a presence of an object.

Notably, segmentation engine 414 is configured to apply different segmentation algorithm parameter values to different portions of the spatial data based on the measured ranging values of those portions of the spatial data. The portions of spatial data to which the segmentation algorithm with variable parameter values is applied may be points of a point cloud. For example, in the case of a density-based spatial clustering of applications with noise (DBSCAN) algorithm being used as the segmentation algorithm, the variable parameters may be the minimum number of points (typically represented as k, or MinPts) that should be present within a neighborhood of points, and radius of the neighborhood (typically represented as $E_{ps}$).

A variety of other segmentation algorithms may be utilized. These include algorithms of various classes, such as data mining algorithms and machine learning algorithms, for example. Each algorithm utilizes a corresponding set of one or more parameters that may be varied in accordance with aspects of the embodiments. Table 1 below provides several examples of known algorithms that may be used, either individually, or in combination, by segmentation engine 414. It should be understood that other algorithms with variable parameters may be likewise utilized.

TABLE 1

Examples of Segmentation Algorithms with Variable Parameters

| Algorithm | Variable Parameters |
| --- | --- |
| K-Means | Number of clusters |
| DBSCAN | Number of points in a cluster (k) |
|  | Distance between points in a cluster or size of neighborhood ($E_{ps}$) |
| KNN Classifier | Number of points sorted in order of distance, to be considered as neighbors of a point. |
| Support Vector Machine Classifier | Kernel type, Kernel parameters, Regularization parameters (C, epsilon) |
| Neural Network | Number of hidden layers |
|  | Learning rate |
|  | Number of learning iterations |
|  | Initial learning weights |
|  | Type of normalization for normalizing features |
| Hidden Markov Model | Window length for learning a sequence |
| Adaboost Classifier | Number of iterations |
| Edge detection for Images | Type of mask (e.g., Sobel, Canny, etc.) |
| Connected Components | Distance between components for considering as connected |
|  | Number of passes |

Parameter adjuster 416 is an engine constructed, programmed, or otherwise configured, to determine the suitable value(s) for the variable parameter(s) to be used for the segmentation algorithm being applied by segmentation engine 414. The parameters may be varied based on the range associated with the portion of the spatial data to which the segmentation algorithm is being applied, as defined by a range-based adjustment function, which may be maintained in data store 418. The parameters may be further varied based on one or more environment-based adjustment functions maintained in data store 420.

Parameter adjuster 416 applies as the input to the range-based adjustment function the ranging information from spatial data parser 412 to produce the adjusted parameter value(s) specific to data points residing at each particular range (or band of ranges) where data points, such as LiDAR returns, are present. Notably, the one or more parameters that affect the sensitivity or selectivity of the segmentation algorithm are adjusted specifically for each of a plurality of ranges at which the 3D spatial data indicates a potential presence of one or more objects. At each range, or band of ranges in the 3D spatial data, common parameter value(s) may be utilized.

The range-based adjustment function may be represented as an algebraic function with range being an independent variable thereof, as one example. In another example, range-based adjustment function may be represented as a lookup table or other suitable data structure. In an example embodiment, a range-based adjustment function for parameter k of a DBSCAN algorithm may take the form of a second-order polynomial as follows:

$$k=ax^2+bx+c, \qquad (EQ1)$$

with coefficient values as a=0.000151, b=−0.03354, and c=3.469367, where x is the range in meters. The parameter $E_{ps}$ may then be computed as the minimum radius in the n-dimensional hypersphere that contains k points, if the data were uniformly distributed.

Similar computations may be performed for the effect of the environmental condition on the parameter values. In an example, a two-stage correction is performed by parameter adjuster 416, with a primary correction of parameter value being made for the range based on the measured range and on range-based adjustment function 418, and a secondary correction of parameter value being made for the one or more environmental conditions, as provided via environmental condition determination 404, and one environment-based adjustment function(s) 420.

In another related embodiment, the segmentation algorithm itself is variable based on one or more of the environmental conditions, or on some other factor. As depicted, algorithm selector 422 is an engine constructed, programmed, or otherwise configured, to determine the segmentation algorithm to use for an assessed measurement scenario. The measurement scenario assessment may be based on the environmental conditions, on the nature of recognized objects, or on some combination of these inputs, for example. Certain weather or lighting conditions may contribute to a scenario for which a particular algorithm (or combination of algorithms) may be better suited than others. Likewise, trends of the types of objects being recognized may be indicative of a certain type of scenario, such as the prevalence of certain types of objects such as pedestrians, bicyclists, and stationary vehicles, which may be indicative of a dense urban setting, contrasted with the prevalence of vegetation, a relatively low density of vehicles, and open spaces, may be indicative of a rural setting. Certain algorithms, or combinations of algorithms may be better suited for segmentation in one setting versus another. The vehicle's current location may also be used as an input to algorithm selector 422. Algorithm selector 422 may store selection criteria that may be applied to indicia of the environmental conditions, object prevalence, or location, to determine the algorithm(s) to be used by segmentation engine 414. An output indicating the selected algorithm may also be provided to parameter adjuster 416 so that the appropriate parameters may be applied.

Calibrator 424 is an engine that is constructed, programmed, or otherwise configured, to determine the range-adjustment function using the spatial data, and segmentation assessment 415. In an example, calibrator 424 is configured to operate sparsely to limit its contribution to the overall computational loading imposed by adaptive segmentation subsystem 410. Calibrator 424 may obtain multiple segmentation assessments 415 representing one or more objects at various distances as they move relative to spatial capture device 402, and applies a regression or other analytical function to evaluate various parameter values of the segmentation algorithm. As a result of the calibration, the range-adjustment function may be updated.

In a related embodiment, adaptive segmentation subsystem 410 is distributed over a plurality of processing platforms. In one such approach, the field of view is divided into a plurality of subspaces by spatial data parser 412, with each subspace handled by a corresponding processing platform on which segmentation engine 414 and parameter adjuster 416 are implemented.

According to some embodiments, object representation engine 430 is constructed, programmed, or otherwise configured, to transform segmentation assessment 415 into representation of a set of objects that were detected by segmentation engine 414, and perform further automated assessment of the objects, such as object recognition, object motion prediction, and the like. The output of object representation engine 430 is provided to vehicle control subsystem 440, which may generate motion-control signaling for the directional and speed control of the automated vehicle.

Figure 5:
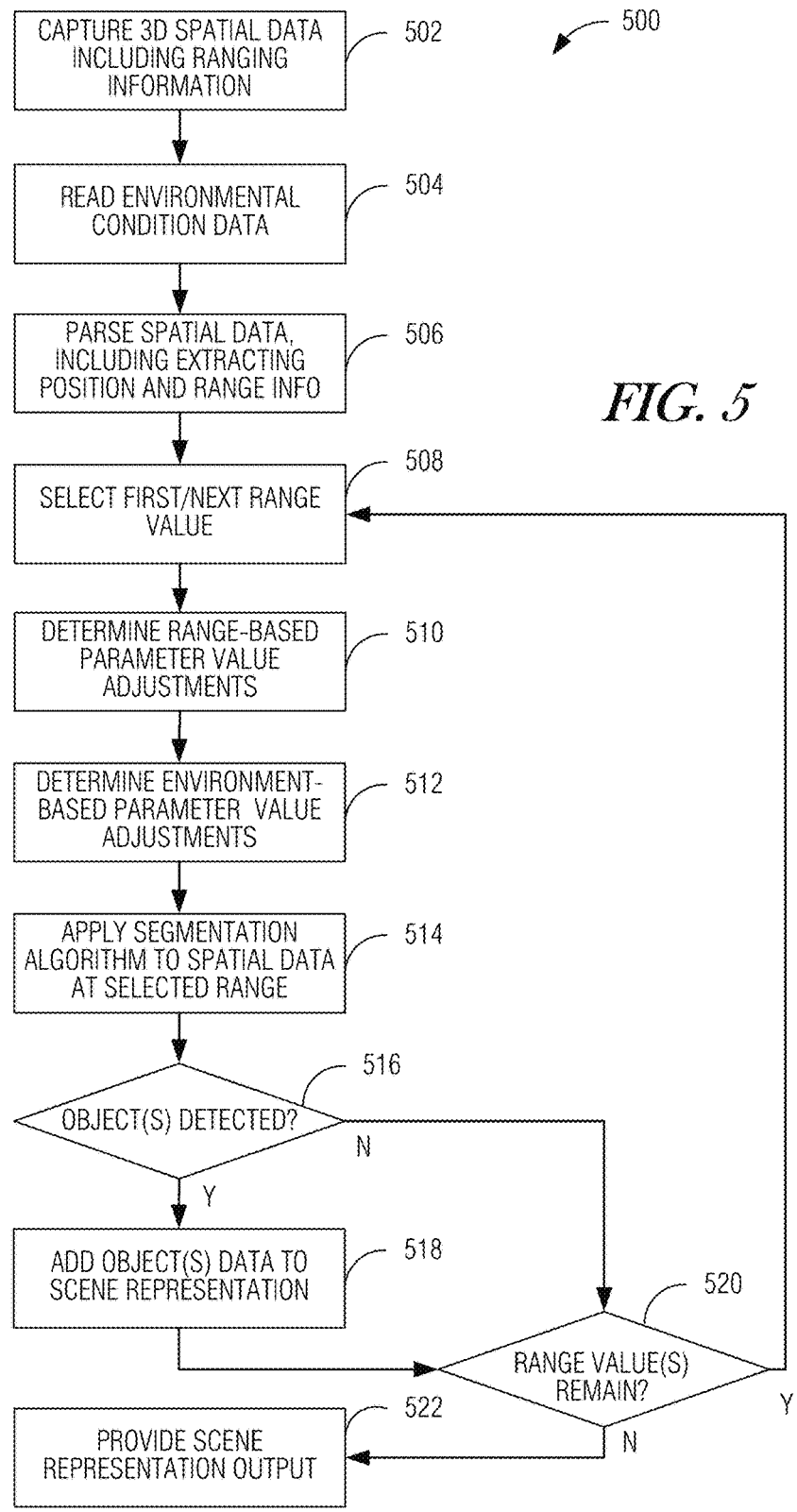
FIG. 5 is a flow diagram illustrating an example process of performing an adaptive segmentation assessment according to some embodiments.

FIG. 5 is a flow diagram illustrating an example process of performing an adaptive segmentation assessment according to some embodiments. Process 500 may be performed by system 400 (FIG. 4) that includes adaptive segmentation subsystem 410, or by a system having a different architecture. Notably, process 500 is a machine-implemented process that operates autonomously (e.g., without user interaction), though the operation of the process may be user initiated, or automatically initiated. In related embodiments, the adaptive segmentation operations are performed in real time, or near-real time (which, for the sake of brevity, is referred to herein as simply "real time"). Real time segmentation in the present context operates with imperceptible or nominal processing delay such that objects throughout a field of view are detected at a rate that is consistent with the rate at which the field of view is scanned or captured.

In addition, it is important to note that process 500 is a richly-featured embodiment that may be realized as described; in addition, portions of the process may be implemented while others are excluded in various embodiments. The following Additional Notes and Examples section details various combinations, without limitation, that are contemplated. It should also be noted that in various embodiments, certain process operations may be performed in a different ordering than depicted in FIG. 5.

At 502, 3D spatial data representing the field of view including measured distances to the surfaces of objects is captured. The spatial data may be represented as a point cloud, for instance, in rectangular, spherical, or cylindrical coordinates. Other representations of the 3D spatial data may be utilized in various related embodiments, such as a depth-bitmap, raster representation, or the like. The 3D spatial data may be captured by spatial data capture device 402, for example, which may include LiDAR or other suitable instrumentation.

At 504, environmental condition data is read from a measurement instrument or other information source, such as environmental condition determination subsystem 404. As discussed above, the environmental condition data may be indicative of the current visibility, among providing other pertinent situational information, such as location.

At 506, the spatial data is parsed to identify or extract the pertinent position and range information. The 3D spatial data may be preprocessed to be converted to another format that may be more readily processed according to some examples. For instance, 3D spatial data captured and initially stored as a raster representation may be converted into point-cloud representation.

Operation 508 begins an adaptive segmentation subroutine that steps through the parsed 3D spatial data according to range. Accordingly, a first range value or band (e.g., 0-2 meters) may be selected.

At 510, range-based adjustments of the segmentation parameter value(s) is performed. The range-based adjustments may involve evaluation of the range-adjustment function for the one or more parameter value. Since the range value or band may include a set of multiple closely-valued individual ranges (e.g., falling within the 0-2-meter band), a representative range value may be determined for the set of range values. As an example, an average range value may be computed based on the individual range values within the current band. As another example, a midpoint for the selected range-value band may simply be selected (e.g., 1 meter for the 0-2-meter band). The selected representative range value may be used by parameter adjuster 416, for example, to evaluate the range-adjustment function. As discussed above, the range-adjustment function may be evaluated arithmetically, using a lookup table, or utilizing any other suitable computational technique.

At 512, the parameter values are further adjusted based on an assessment of one or more environmental conditions. For instance, in reduced-visibility conditions, a threshold for LiDAR return amplitude may be reduced, and the segmentation clustering criteria may be further reduced. This parameter value refinement may be carried out by parameter adjuster 416, for example.

At 514, segmentation engine 414 performs the segmentation analysis for the current range band. The parameter values for the applied segmentation algorithm have been adjusted specifically for the range being examined in the present pass. Candidate data points meeting the clustering or other relevant criteria may be deemed an object by application of the segmentation algorithm. At decision 516, if one or more distinct objects are detected, the process advances to operation 518, where segmentation engine 414 may add a representation of each object to a scene-representation data structure containing objects and their size and position within the field of view, for example.

If objects are not detected at decision 516, the process simply advances to decision 520, which tests whether the entire depth of the field of view (all ranges) have been evaluated. In the case where one or more ranges remain unevaluated, the process loops to operation 508, where the next range or band of ranges is selected for analysis. For example, following the 0-2-meter band, the next selection may be a range of 2-5 meters. As this simplified example illustrates, the sizing of the bands of ranges may vary. For example, the band sizes may increase according to a logarithmic scale.

Operations 510-520 are repeated for each of the remaining ranges of the parsed spatial data that contain data points. As a result, multiple different parameter values are applied in executing the segmentation algorithm, as a function of the corresponding range, and this is achieved in real time.

When the entire depth of the field of view has been analyzed, decision 520 branches to 522, where the scene representation output is provided to other components of the vehicle control system, such as object representation engine 430, and vehicle control sub system 440, for object recognition processing, and self-driving operations, respectively.

Figure 6:
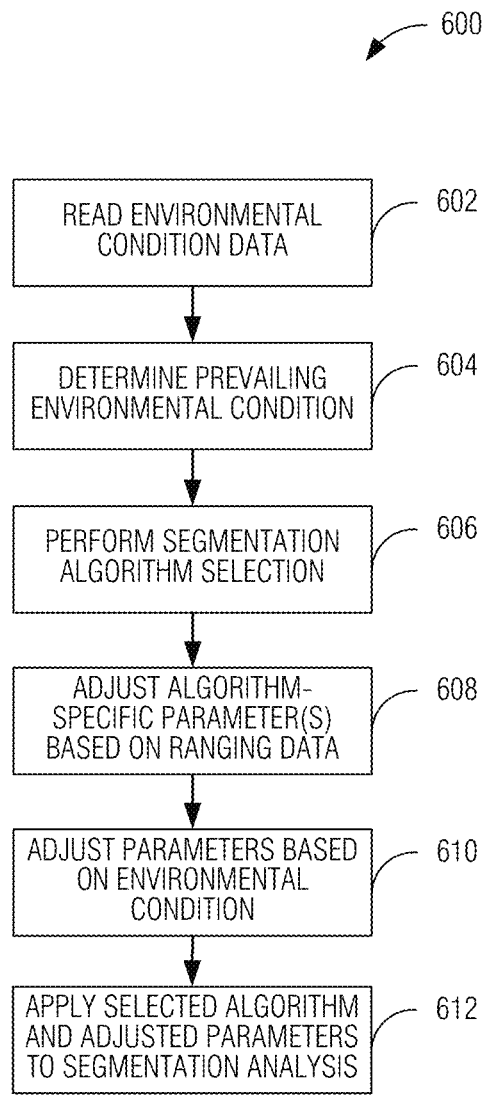
FIG. 6 is a flow diagram illustrating an example process for selection of a segmentation algorithm.

FIG. 6 is a flow diagram illustrating an example process 600 for selection of a segmentation algorithm. Process 600 may be performed by system 400 (FIG. 4) that includes adaptive segmentation subsystem 410, or by a system having a different architecture. Process 600 may be performed sparsely, such as after the passage of time on the order of tens of minutes, for example, since the environmental condition is not expected to change frequently. At 602, environmental condition data is read from a measurement instrument or other information source, such as environmental condition determination subsystem 404. As discussed above, the environmental condition data may be indicative of the current visibility, among providing other pertinent situational information, such as the current location, or indicia from which the type of location may be inferred.

At 604, the prevailing condition is determined. This operation may be performed by algorithm selector 422, for example. Classification of the prevailing condition may produce a measure of visibility or a determination of type of context or setting (e.g., dense urban setting, rural, forest, desert, off-road, etc.). Any suitable decision algorithm may be utilized, including data mining (e.g., clustering, classification, rule mining, etc.), neural network, or other.

At 606, in response to the prevailing environmental condition determination, the segmentation algorithm is selected from among a set of available algorithms. The selection logic may be implemented by algorithm selector 422, and may be as simple as a lookup table that associates segmentation algorithms with prevailing environmental conditions, for example.

At 608, the segmentation algorithm-specific parameter(s) are adjusted based on the ranging data by parameter adjuster 416, for example. Examples of this operation are discussed above with reference to operation 510 (FIG. 5). At 610, the segmentation algorithm parameter values are further refined based on one or more assessments of environmental conditions. Examples of this refinement are discussed above with reference to operation 512 (FIG. 5).

At 612, the selected segmentation algorithm and associated parameter values for the plurality of ranges are applied successively to each range or band of ranges, with the selected corresponding parameter values. As discussed in greater detail above with reference to operations 508-520 of FIG. 5, each range or band of ranges is generally assessed by the segmentation algorithm using a common set of the applicable parameter value(s), with different parameter values applied to different ranges or bands of ranges.

Figure 7:
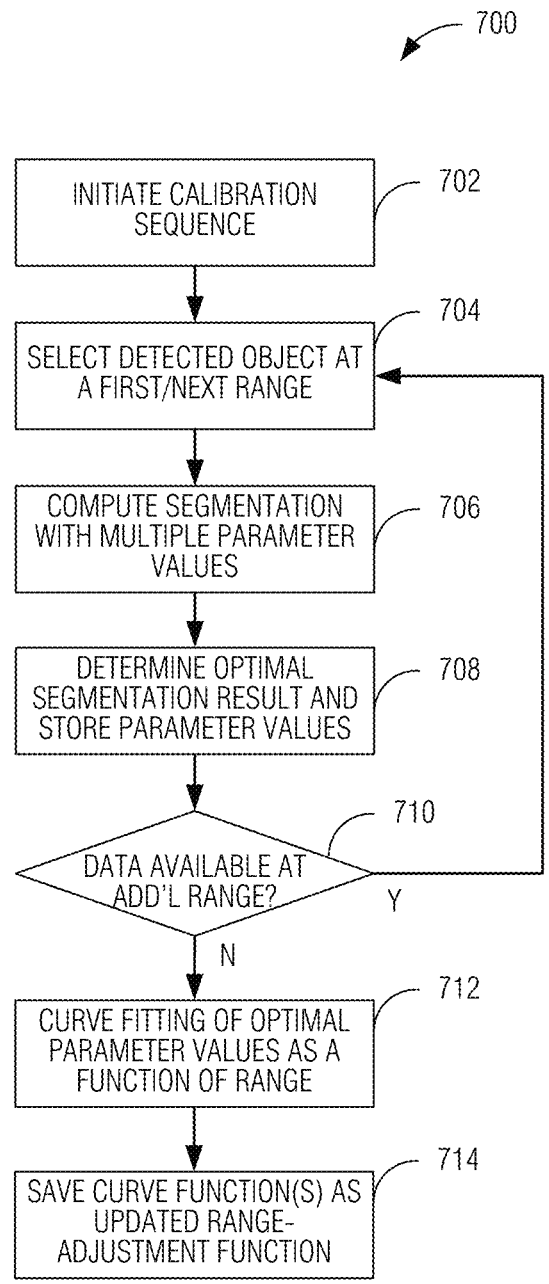
FIG. 7 is a flow diagram illustrating an example calibration process according to some embodiments.

FIG. 7 is a flow diagram illustrating an example calibration process according to some embodiments. Process 700 may be performed by system 400 (FIG. 4) that includes adaptive segmentation subsystem 410 with calibrator 424, or by a system having a different architecture. According to an example, calibrator 424 performs process 700 in cooperation with the other components of adaptive segmentation subsystem 410.

At 702, the calibration sequence is initiated. Initiation may be in response to a defined passage of time on the order of tens of minutes or hours, for example, or in response to a substantial change in the prevailing environmental condition that meets or exceeds a defined threshold, a change in the selected segmentation algorithm, or other precondition for calibration. A related criterion for calibration is suitability of a situational configuration of the vehicle, its environment, and objects within the field of view. To this end, vehicle control system 440 may supply a situational assessment to calibrator 424, which operation 702 may take into account when determining whether to initiate calibration. According to an example approach, calibration principally involves testing variable segmentation algorithm parameter values at multiple ranges as the segmentation algorithm is executed.

At 704, calibrator 424 selects one or more objects detected by segmentation engine 414. The object may be at a first range (e.g., near, intermediate, or distant). At 706, segmentation is performed (e.g., by segmentation engine 414) multiple times on the 3D spatial data representative of the object, as well as its surroundings, with each segmentation operation being performed with varied parameter values.

At 708, the segmentation assessment 415 resulting from each segmentation operation is compared against the others corresponding to the same range, and an optimal set of parameter value(s) are determined as those corresponding to the optimal segmentation performance. Segmentation performance may be defined specifically for a given system design, and the criteria may vary based on the environmental condition or navigational objective. As a general principle, parameter values that produce a segmentation assessment with the highest selectivity sensitivity measures (e.g., using a selectivity-sensitivity product or other suitable aggregation) may be determined to be optimal according to an example.

At 710, a decision is made whether there is available 3D spatial data for the object at an additional range. For instance, the decision may be satisfied if the distance between the object and the measuring instrumentation has changed. In the affirmative case, the process loops back to 704, where the same object is once again selected for segmentation algorithm parameter variation and testing. Otherwise decision 710 advances the process flow to bock 712, where a regression analysis may be performed to determine curve function(s) of parameter values as a function range. At 714, the curve function(s) for each variable parameter are saved to update range-adjustment function 418.

Additional Notes & Examples

Example 1 is an apparatus for a machine-vision system, the apparatus comprising: an input configured to access captured three-dimensional (3D) spatial data representing a field of view and including ranging measurements to various points within the field of view; a segmentation engine configured to apply a segmentation algorithm to the 3D spatial data to produce a segmentation assessment indicating a presence of individual objects within the field of view, wherein the segmentation algorithm is based on at least one adjustable parameter; and a parameter adjuster configured to adjust a value of the at least one adjustable parameter based on the ranging measurements; wherein the segmentation assessment is based on application of the segmentation algorithm to the 3D spatial data, with different values of the at least one adjustable parameter value corresponding to different values of the ranging measurements of the various points within the field of view.

In Example 2, the subject matter of Example 1 includes, wherein adjustment of the at least one adjustable parameter value varies sensitivity and selectivity of the segmentation algorithm.

In Example 3, the subject matter of Examples 1-2 includes, wherein the 3D spatial data includes a point cloud.

In Example 4, the subject matter of Examples 1-3 includes, wherein the 3D spatial data includes data representing light detection and ranging (LiDAR) returns.

In Example 5, the subject matter of Examples 1-4 includes, wherein the at least one segmentation algorithm includes a density-based spatial clustering of applications with noise (DBSCAN) algorithm, and wherein the at least one adjustable parameter includes a minimum number of points that are expected to be present within a neighborhood of points, and a neighborhood size indicator.

In Example 6, the subject matter of Examples 1-5 includes, wherein the segmentation algorithm includes a clustering algorithm.

In Example 7, the subject matter of Examples 1-6 includes, wherein the parameter adjuster is configured to adjust a value of the at least one adjustable parameter such that points within the field of view falling within a common band of ranges are associated with a common at least one value of the at least one adjustable parameter.

In Example 8, the subject matter of Examples 1-7 includes, wherein the parameter adjuster is configured to apply a range-based adjustment function to adjust the value of the at least one adjustable parameter as a function of range.

In Example 9, the subject matter of Example 8 includes, wherein the range-based adjustment function is a second-order polynomial.

In Example 10, the subject matter of Examples 8-9 includes, a calibrator configured to adjust the range-based adjustment function in response to a calibration process wherein optimized parameter values of the at least one adjustable parameter are determined for various ranges.

In Example 11, the subject matter of Examples 1-10 includes, wherein the parameter adjuster is configured to adjust a value of the at least one adjustable parameter based on an environmental condition determination.

In Example 12, the subject matter of Example 11 includes, wherein the environmental condition determination includes a measure of visibility.

In Example 13, the subject matter of Examples 1-12 includes, an algorithm selector configured to dynamically select the segmentation algorithm from among a plurality of available segmentation algorithms based on an assessed measurement scenario.

In Example 14, the subject matter of Example 13 includes, wherein the assessed measurement scenario includes an environmental condition determination.

In Example 15, the subject matter of Examples 13-14 includes, wherein the assessed measurement scenario includes an object type prevalence determination.

In Example 16, the subject matter of Examples 1-15 includes, an output of the segmentation engine, the output configured to provide a segmentation assessment for use by a vehicle control system.

In Example 17, the subject matter of Examples 1-16 includes, a computing platform including at least one processor core, memory, and input/output facilities, wherein the memory includes instructions that, when executed by the memory, cause the computing platform to implement the segmentation engine and the parameter adjuster.

Example 18 is at least one machine-readable medium comprising instructions that, when executed on a machine vision system, cause the machine vision system to: capture three-dimensional (3D) spatial data representing a field of view and including ranging measurements to various points within the field of view; apply a segmentation algorithm to the 3D spatial data to produce a segmentation assessment indicating a presence of individual objects within the field of view, wherein the segmentation algorithm is based on at least one adjustable parameter; and adjust a value of the at least one adjustable parameter based on the ranging measurements; wherein the segmentation assessment is based on application of the segmentation algorithm to the 3D spatial data, with different values of the at least one adjustable parameter value corresponding to different values of the ranging measurements of the various points within the field of view.

In Example 19, the subject matter of Example 18 includes, wherein adjustment of the at least one adjustable parameter value varies sensitivity and selectivity of the segmentation algorithm.

In Example 20, the subject matter of Examples 18-19 includes, wherein the 3D spatial data includes a point cloud.

In Example 21, the subject matter of Examples 18-20 includes, wherein the 3D spatial data includes data representing light detection and ranging (LiDAR) returns.

In Example 22, the subject matter of Examples 18-21 includes, wherein the at least one segmentation algorithm includes a density-based spatial clustering of applications with noise (DBSCAN) algorithm, and wherein the at least one adjustable parameter includes a minimum number of points that are expected to be present within a neighborhood of points, and a neighborhood size indicator.

In Example 23, the subject matter of Examples 18-22 includes, wherein the segmentation algorithm includes a clustering algorithm.

In Example 24, the subject matter of Examples 18-23 includes, wherein adjustment of the value of the at least one adjustable parameter is to be performed such that points within the field of view falling within a common band of ranges are associated with a common at least one value of the at least one adjustable parameter.

In Example 25, the subject matter of Examples 18-24 includes, wherein the adjustment of the value of the at least one adjustable parameter is to include application of a range-based adjustment function to adjust the value of the at least one adjustable parameter as a function of range.

In Example 26, the subject matter of Example 25 includes, wherein the range-based adjustment function is a second-order polynomial.

In Example 27, the subject matter of Examples 25-26 includes, instructions for adjusting the range-based adjustment function in response to a calibration process wherein optimized parameter values of the at least one adjustable parameter are determined for various ranges.

In Example 28, the subject matter of Examples 18-27 includes, wherein the adjustment of the range-based adjustment function adjusts a value of the at least one adjustable parameter based on an environmental condition determination.

In Example 29, the subject matter of Example 28 includes, wherein the environmental condition determination includes a measure of visibility.

In Example 30, the subject matter of Examples 18-29 includes, instructions for dynamically selecting the segmentation algorithm from among a plurality of available segmentation algorithms based on an assessed measurement scenario.

In Example 31, the subject matter of Example 30 includes, wherein the assessed measurement scenario includes an environmental condition determination.

In Example 32, the subject matter of Examples 30-31 includes, wherein the assessed measurement scenario includes an object type prevalence determination.

Example 33 is a method for a machine vision processing, the method comprising: capturing three-dimensional (3D) spatial data representing a field of view and including ranging measurements to various points within the field of view; applying a segmentation algorithm to the 3D spatial data to produce a segmentation assessment indicating a presence of individual objects within the field of view, wherein the segmentation algorithm is based on at least one adjustable parameter; and adjusting a value of the at least one adjustable parameter based on the ranging measurements; wherein the segmentation assessment is based on application of the segmentation algorithm to the 3D spatial data, with different values of the at least one adjustable parameter value corresponding to different values of the ranging measurements of the various points within the field of view.

In Example 34, the subject matter of Example 33 includes, wherein adjustment of the at least one adjustable parameter value varies sensitivity and selectivity of the segmentation algorithm.

In Example 35, the subject matter of Examples 33-34 includes, wherein the 3D spatial data includes a point cloud.

In Example 36, the subject matter of Examples 33-35 includes, wherein the 3D spatial data includes data representing light detection and ranging (LiDAR) returns.

In Example 37, the subject matter of Examples 33-36 includes, wherein the at least one segmentation algorithm includes a density-based spatial clustering of applications with noise (DBSCAN) algorithm, and wherein the at least one adjustable parameter includes a minimum number of points that are expected to be present within a neighborhood of points, and a neighborhood size indicator.

In Example 38, the subject matter of Examples 33-37 includes, wherein the segmentation algorithm includes a clustering algorithm.

In Example 39, the subject matter of Examples 33-38 includes, wherein adjusting a value of the at least one adjustable parameter is performed such that points within the field of view falling within a common band of ranges are associated with a common at least one value of the at least one adjustable parameter.

In Example 40, the subject matter of Examples 33-39 includes, wherein adjusting the value of the at least one adjustable parameter includes applying a range-based adjustment function to adjust the value of the at least one adjustable parameter as a function of range.

In Example 41, the subject matter of Example 40 includes, wherein the range-based adjustment function is a second-order polynomial.

In Example 42, the subject matter of Examples 40-41 includes, adjusting the range-based adjustment function in response to a calibration process wherein optimized parameter values of the at least one adjustable parameter are determined for various ranges.

In Example 43, the subject matter of Examples 33-42 includes, wherein the adjusting the range-based adjustment function adjusts a value of the at least one adjustable parameter based on an environmental condition determination.

In Example 44, the subject matter of Example 43 includes, wherein the environmental condition determination includes a measure of visibility.

In Example 45, the subject matter of Examples 33-44 includes, dynamically selecting the segmentation algorithm from among a plurality of available segmentation algorithms based on an assessed measurement scenario.

In Example 46, the subject matter of Example 45 includes, wherein the assessed measurement scenario includes an environmental condition determination.

In Example 47, the subject matter of Examples 45-46 includes, wherein the assessed measurement scenario includes an object type prevalence determination.

Example 48 is a system for a machine vision processing, the system comprising: means for capturing three-dimensional (3D) spatial data representing a field of view and including ranging measurements to various points within the field of view; means for applying a segmentation algorithm to the 3D spatial data to produce a segmentation assessment indicating a presence of individual objects within the field of view, wherein the segmentation algorithm is based on at least one adjustable parameter; and means for adjusting a value of the at least one adjustable parameter based on the ranging measurements; wherein the segmentation assessment is based on application of the segmentation algorithm to the 3D spatial data, with different values of the at least one adjustable parameter value corresponding to different values of the ranging measurements of the various points within the field of view.

In Example 49, the subject matter of Example 48 includes, wherein adjustment of the at least one adjustable parameter value varies sensitivity and selectivity of the segmentation algorithm.

In Example 50, the subject matter of Examples 48-49 includes, wherein the 3D spatial data includes a point cloud.

In Example 51, the subject matter of Examples 48-50 includes, wherein the 3D spatial data includes data representing light detection and ranging (LiDAR) returns.

In Example 52, the subject matter of Examples 48-51 includes, wherein the at least one segmentation algorithm includes a density-based spatial clustering of applications with noise (DBSCAN) algorithm, and wherein the at least one adjustable parameter includes a minimum number of points that are expected to be present within a neighborhood of points, and a neighborhood size indicator.

In Example 53, the subject matter of Examples 48-52 includes, wherein the segmentation algorithm includes a clustering algorithm.

In Example 54, the subject matter of Examples 48-53 includes, wherein the means for adjusting the value of the at least one adjustable parameter is configured to adjust a value of the at least one adjustable parameter such that points within the field of view falling within a common band of ranges are associated with a common at least one value of the at least one adjustable parameter.

In Example 55, the subject matter of Examples 48-54 includes, wherein the means for adjusting the value of the at least one adjustable parameter is configured to apply a range-based adjustment function to adjust the value of the at least one adjustable parameter as a function of range.

In Example 56, the subject matter of Example 55 includes, wherein the range-based adjustment function is a second-order polynomial.

In Example 57, the subject matter of Examples 55-56 includes, means for adjusting the range-based adjustment function in response to a calibration process wherein optimized parameter values of the at least one adjustable parameter are determined for various ranges.

In Example 58, the subject matter of Examples 48-57 includes, wherein the means for adjusting the range-based adjustment function adjusts a value of the at least one adjustable parameter based on an environmental condition determination.

In Example 59, the subject matter of Example 58 includes, wherein the environmental condition determination includes a measure of visibility.

In Example 60, the subject matter of Examples 48-59 includes, means for dynamically selecting the segmentation algorithm from among a plurality of available segmentation algorithms based on an assessed measurement scenario.

In Example 61, the subject matter of Example 60 includes, wherein the assessed measurement scenario includes an environmental condition determination.

In Example 62, the subject matter of Examples 60-61 includes, wherein the assessed measurement scenario includes an object type prevalence determination.

In Example 63, the subject matter of Examples 48-62 includes, a computing platform including at least one processor core, memory, and input/output facilities, wherein the memory includes instructions that, when executed by the memory, cause the computing platform to implement the segmentation engine and the parameter adjuster.

Example 64 is at least one machine-readable medium including instructions that, when executed by processing circuitry, cause the processing circuitry to perform operations to implement of any of Examples 1-63.

Example 65 is an apparatus comprising means to implement of any of Examples 1-63.

Example 66 is a system to implement of any of Examples 1-63.

Example 67 is a method to implement of any of Examples 1-63.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus for a machine-vision system, the apparatus comprising:
    an input configured to access captured three-dimensional (3D) spatial data representing a field of view and including ranging measurements to various points within the field of view;
    a segmentation engine configured to apply a segmentation algorithm to the 3D spatial data to produce a segmentation assessment indicating a presence of individual objects within the field of view, wherein the segmentation algorithm is based on at least one adjustable parameter; and
    a parameter adjuster configured to adjust a value of the at least one adjustable parameter based on the ranging measurements;
    wherein the segmentation assessment is based on application of the segmentation algorithm to the 3D spatial data, with different values of the at least one adjustable parameter value corresponding to different values of the ranging measurements of the various points within the field of view.

2. The apparatus of claim 1, wherein the 3D spatial data includes data representing light detection and ranging (LiDAR) returns.

3. The apparatus of claim 1, wherein the parameter adjuster is configured to adjust a value of the at least one adjustable parameter such that points within the field of view falling within a common band of ranges are associated with a common at least one value of the at least one adjustable parameter.

4. The apparatus of claim 1, wherein the parameter adjuster is configured to apply a range-based adjustment function to adjust the value of the at least one adjustable parameter as a function of range.

5. The apparatus of claim 4, wherein the range-based adjustment function is a second-order polynomial.

6. The apparatus of claim 4, further comprising:
    a calibrator configured to adjust the range-based adjustment function in response to a calibration process wherein optimized parameter values of the at least one adjustable parameter are determined for various ranges.

7. The apparatus of claim 1, wherein the parameter adjuster is configured to adjust a value of the at least one adjustable parameter based on an environmental condition determination.

8. The apparatus of claim 7, wherein the environmental condition determination includes a measure of visibility.

9. The apparatus of claim 1, further comprising:
an algorithm selector configured to dynamically select the segmentation algorithm from among a plurality of available segmentation algorithms based on an assessed measurement scenario.

10. The apparatus of claim 9, wherein the assessed measurement scenario includes an environmental condition determination.

11. The apparatus of claim 9, wherein the assessed measurement scenario includes an object type prevalence determination.

12. The apparatus of claim 1, further comprising:
an output of the segmentation engine, the output configured to provide a segmentation assessment for use by a vehicle control system.

13. The apparatus of claim 1, further comprising:
a computing platform including at least one processor core, memory, and input/output facilities, wherein the memory includes instructions that, when executed by the memory, cause the computing platform to implement the segmentation engine and the parameter adjuster.

14. At least one non-transitory machine-readable storage medium comprising instructions that, when executed on a machine vision system, cause the machine vision system to:
capture three-dimensional (3D) spatial data representing a field of view and including ranging measurements to various points within the field of view;
apply a segmentation algorithm to the 3D spatial data to produce a segmentation assessment indicating a presence of individual objects within the field of view, wherein the segmentation algorithm is based on at least one adjustable parameter; and
adjust a value of the at least one adjustable parameter based on the ranging measurements;
wherein the segmentation assessment is based on application of the segmentation algorithm to the 3D spatial data, with different values of the at least one adjustable parameter value corresponding to different values of the ranging measurements of the various points within the field of view.

15. The at least one machine-readable medium of claim 14, wherein the 3D spatial data includes a point cloud.

16. The at least one machine-readable medium of claim 14, wherein the 3D spatial data includes data representing light detection and ranging (LiDAR) returns.

17. The at least one machine-readable medium of claim 14, wherein the at least one segmentation algorithm includes a density-based spatial clustering of applications with noise (DBSCAN) algorithm, and wherein the at least one adjustable parameter includes a minimum number of points that are expected to be present within a neighborhood of points, and a neighborhood size indicator.

18. The at least one machine-readable medium of claim 14, wherein the segmentation algorithm includes a clustering algorithm.

19. The at least one machine-readable medium of claim 14, wherein adjustment of the value of the at least one adjustable parameter is to be performed such that points within the field of view falling within a common band of ranges are associated with a common at least one value of the at least one adjustable parameter.

20. The at least one machine-readable medium of claim 14, wherein the adjustment of the value of the at least one adjustable parameter is to include application of a range-based adjustment function to adjust the value of the at least one adjustable parameter as a function of range.

21. The at least one machine-readable medium of claim 14, wherein the adjustment of the range-based adjustment function adjusts a value of the at least one adjustable parameter based on an environmental condition determination.

22. The at least one machine-readable medium of claim 14, further comprising:
instructions for dynamically selecting the segmentation algorithm from among a plurality of available segmentation algorithms based on an assessed measurement scenario.

23. A method for a machine vision processing, the method comprising:
capturing three-dimensional (3D) spatial data representing a field of view and including ranging measurements to various points within the field of view;
applying a segmentation algorithm to the 3D spatial data to produce a segmentation assessment indicating a presence of individual objects within the field of view, wherein the segmentation algorithm is based on at least one adjustable parameter; and
adjusting a value of the at least one adjustable parameter based on the ranging measurements;
wherein the segmentation assessment is based on application of the segmentation algorithm to the 3D spatial data, with different values of the at least one adjustable parameter value corresponding to different values of the ranging measurements of the various points within the field of view.

24. The method of claim 23, wherein adjusting the value of the at least one adjustable parameter includes applying a range-based adjustment function to adjust the value of the at least one adjustable parameter as a function of range.

25. The method of claim 23, further comprising:
dynamically selecting the segmentation algorithm from among a plurality of available segmentation algorithms based on an assessed measurement scenario.

* * * * *